Patented Feb. 12, 1935

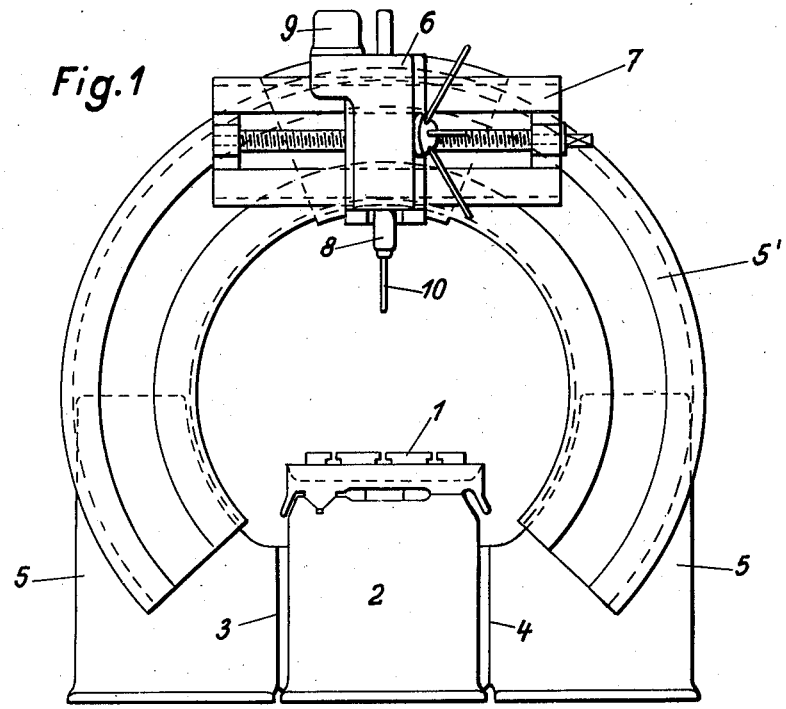
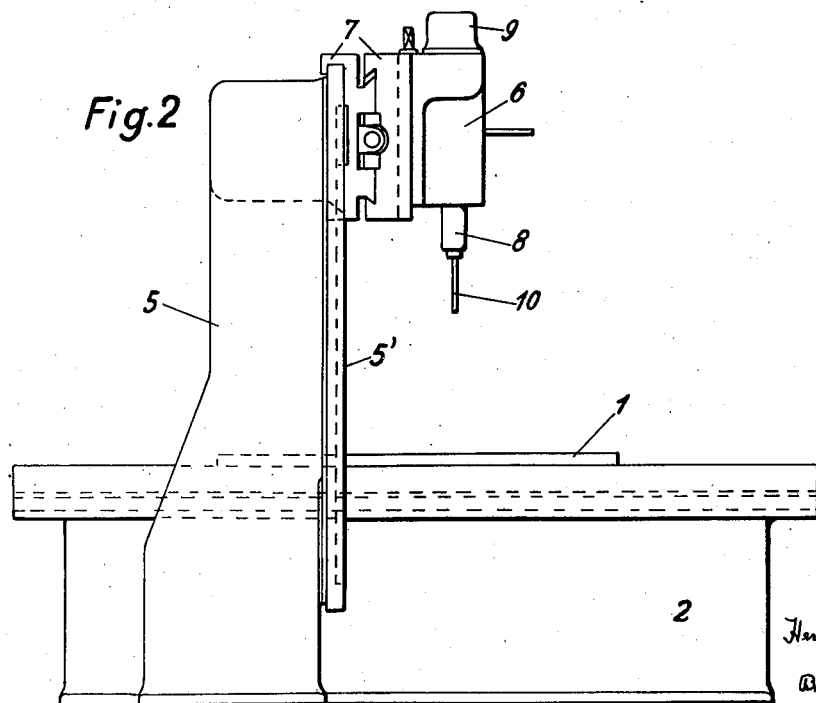

1,991,285

UNITED STATES PATENT OFFICE 1,991,285

MACHINE TOOL WITH ROTARY TOOL

Herbert Lindner, Berlin, Germany

Application June 3, 1933, Serial No. 674,237
In Germany September 2, 1932

1 Claim. (Cl. 77—5)

The invention relates to a machine tool for machining articles by means of a rotary tool, the said machine being distinguished from the known machine by the special construction of the housing employed for receiving and guiding the tool spindle carrier.

In a machine tool, such as for example, milling, grinding or drilling machines, having its tool slidably mounted on a cross-rail carried on two vertical uprights (planing machine type of housing), generally only that face of the work-piece which is opposite the clamped or set end is machinable, and machining of the other faces can only be done after re-setting the work-piece. Consequently tools have also been mounted on the vertical uprights in order to be able to machine a work-piece simultaneously on the lateral faces also. In addition, for machining inclined work-piece faces, the tool spindle carrier, movable on a straight guide, has been made adjustable for inclination about a pivot. A type of machine tool is also known in which the work-piece is mounted on a centrally arranged circular table, and which is provided, similar to the revolving head type, with a plurality of tools situated in a horizontal plane and radially directed upon the work-piece, by means whereof the work-piece is machined in a pre-determined sequence. All these embodiments, the aim of which is to comprise the dimensions of the work-piece as far as possible on all sides during machining, generally necessitate a complicated and expensive construction without solving the problem in the most perfect manner. The said known constructions also do not possess a universal character, being generally constructed for special purposes.

It is the object of the invention to obviate these disadvantages. According to the invention, an arcuate housing having a guide surface of the same form and mounted vertically to the work-table is employed for receiving and guiding one or more tool spindle carriers. The housing according to the invention may be combined with all the usual types of work-tables to form a machine unit.

By suitable adjustment of the tool spindle carrier on the arcuate guide surface of the housing it is possible to machine a work-piece on the face opposite the set side, the two lateral faces and any face inclined at any angle to the clamping plane between 0° and 180° or above, without re-setting the work-piece. The effect of the invention is still more perfect if the work-piece is fixed on a circular or rotary table combined with a long is possible to machine all the other faces. It is also possible to mount a plurality of tool spindle carriers on the arcuate housing in order to machine different work-piece sides simultaneously.

A machine tool according to the invention is shown diagrammatically in the accompanying drawing, wherein:

Figure 1 is a front view and
Figure 2 is a side view.

The work-table preferably constructed in the form of a combined round and long table, is adjustably or reciprocatably guided on a bed 2 in known manner. The housing 5 is rigidly fixed to the bed 2 at the points 3 and 4, and arches over the said bed in the form of a closed arc. The tool spindle carrier 6 is mounted on a cross-slide 7 on the arcuate guide way 5' of the housing 5, the said guide being directed at right angles to the clamping surface of the table 1. The cross-slide 7 is adjustable relatively to the work-piece in two directions intersecting at 90°, so that all work-piece dimensions, both in breadth and depth, can be compassed with the machining tool. The tool spindle 8, the axis of which is parallel to the guide 5', is driven by a flanged-on electric motor, or advantageously by a smoothly regulatable hydraulic rotary drive 9 which is supplied with pressure fluid by an independent pump.

In the drawing, a drill 10 has been shown as machining tool, but of course it may be replaced by any other rotary tool. As a result of the arcuate construction of the guide 5' of the housing 5 according to the invention, the tool spindle carrier 6 with the tool 10 can be adjusted as desired in a plane at right angles to the clamping surface of the table within a range of 0° to 180° or more, and thus a comprehensive machining of a work-piece can be attained in a simple manner.

The machine tool according to the invention is universally applicable and may be constructed in the form of a milling, grinding or drilling machine or the like.

I claim:

A machine tool with a rotary tool for drilling, milling, grinding or the like, comprising a fixed bed, a reciprocable work-holder movable horizontally on said bed, a housing fixed on said bed and having arcuate guide-ways extending over and about said work-holder, a tool slide movable along and guided by said arcuate guide-ways so that the slide may occupy varying angular positions with respect to the work-holder in a plane at right angles to the direction of movement of the work-holder, said tool slide including a rectilinear guide member extending tangentially with respect to said arcuate guide-ways, a spindle carrier guided by and movable along said guide member for presentation in angularly and tangentially adjusted position opposite any point of the breadth and depth of the work, and a spindle for said tool journaled in said carrier and reciprocable toward and from the work-holder, whereby tool operations may be performed upon and through the top and side surfaces of the work and at varying angles and points while the work is held in a single clamped position upon the work-holder.

HERBERT LINDNER.